Aug. 9, 1955  A. S. KROTZ  2,715,022
SPRING SUSPENSION
Filed Dec. 7, 1949
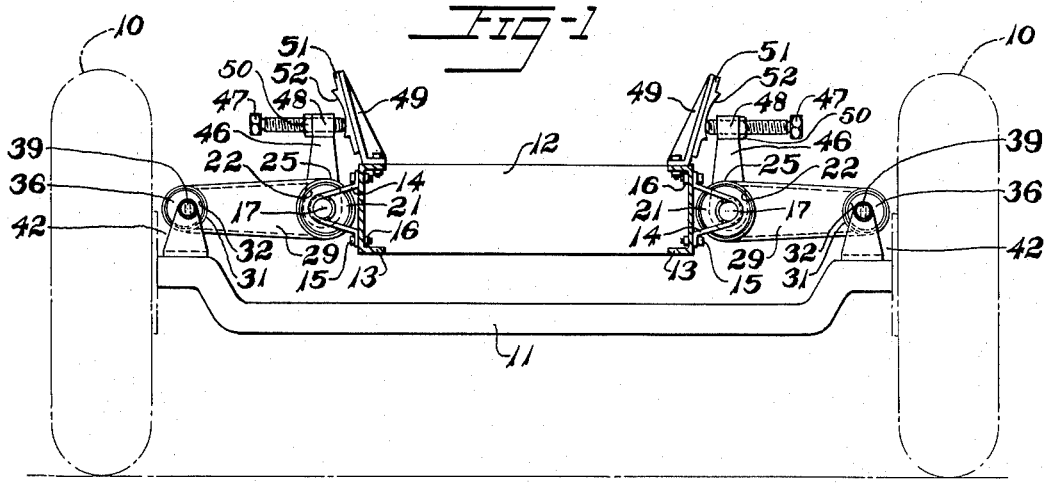
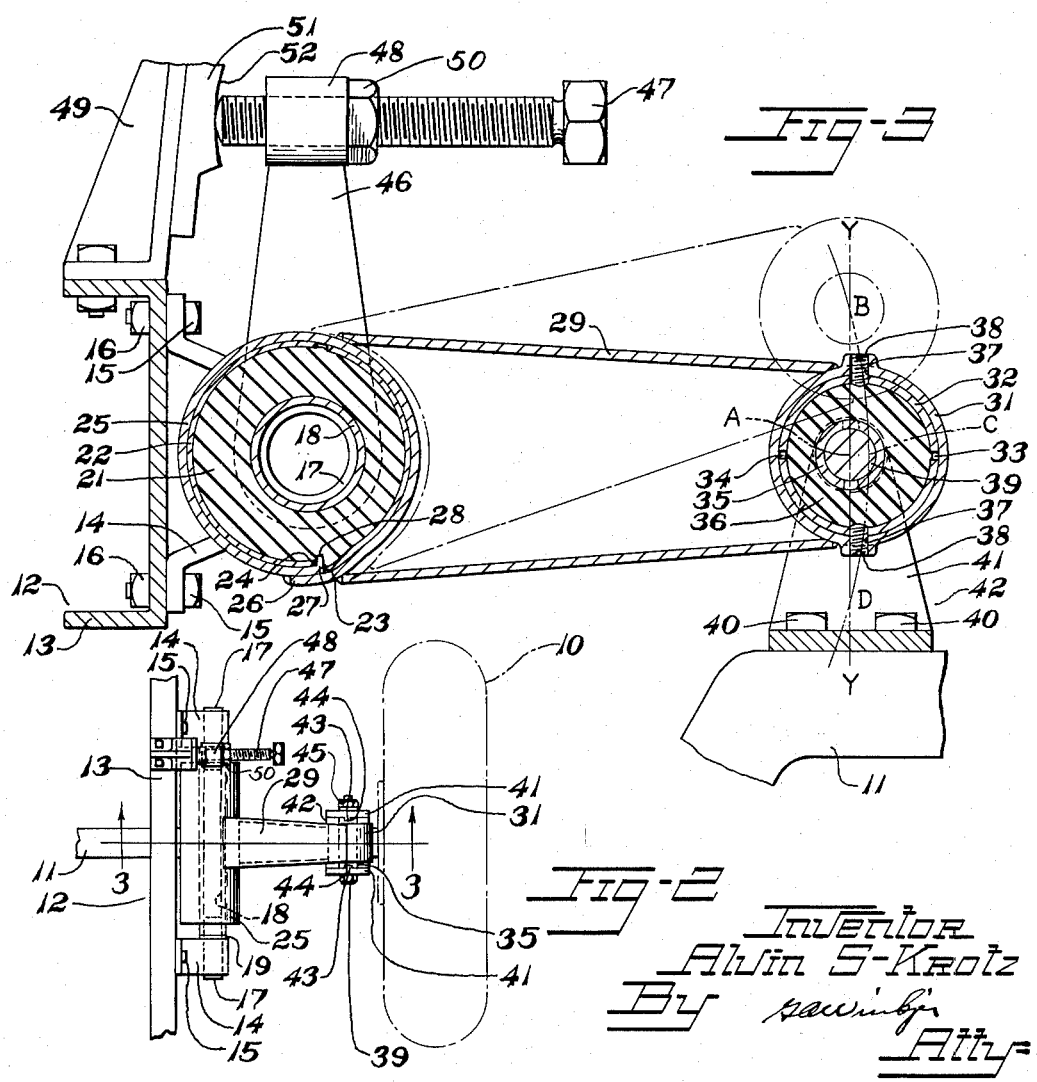
Inventor
Alvin S. Krotz
By
Att'y

United States Patent Office 2,715,022
Patented Aug. 9, 1955

2,715,022

SPRING SUSPENSION

Alvin S. Krotz, Akron, Ohio, assignor to The B. F. Goodrich Company, New York, N. Y., a corporation of New York Application December 7, 1949, Serial No. 131,594

6 Claims. (Cl. 267—57.1)

This invention relates to spring suspensions and especially to suspensions for vehicles such as automobiles and other highway and ground vehicles, and rail vehicles where it is desirable to cushion the vehicle from shocks and vibrations.

In providing cushioning for a vehicle it is desirable that the springing be soft in the normally loaded condition of the vehicle to cushion the vehicle from small irregularities in the road surface. However, as the wheels move away from the normally loaded static position it is desirable that the springing be stiffened to arrest gradually the vertical movement of the wheel structures without objectionably jarring the vehicle. In addition to these requirements it is often desirable that the range of wheel deflection be large for the sake of softness of ride and that large irregularities in the surface traveled over may be adequately cushioned. Moreover it is desirable that the construction be such as to give the designer a wide range of choice of load-deflection characteristics so as to suit the ride characteristics to the individual requirements of a wide variety of vehicle types.

Objects of this invention are to provide for satisfying the above and other requirements, and especially to provide this in a suspension of simplified construction.

Other objects are to provide for a soft spring rate in a considerable range of normal spring deflections and a gradually increasing rate as the deflections are increased beyond this range, to provide for obtaining predetermined compression effects in a torsion type spring and thereby provide for the desired modification of the torsional spring rate with a minimum of structure, to provide these results by a plurality of torsion springs functioning together to modify the action of one another, to provide cushioning in all directions between the wheel structures and the vehicle body structure and to provide for ease of construction and convenience in service and adjustment of the suspension.

These and other objects will be apparent from the following description, reference being had to the drawings in which:

Fig. 1 is an end elevation of a vehicle suspension built in accordance with and embodying the invention.

Fig. 2 is a plan view of the right hand portion of the suspension shown in Fig. 1, parts being broken away.

Fig. 3 is a section taken along line 3—3 of Fig. 2.

Referring to the drawings, a vehicle suspension embodying the invention is shown in which the wheels 10, 10 are disposed on opposite sides of the vehicle. The wheels 10, 10 are mounted rotatably on a supporting structure such as axle 11 which extends from one side of the vehicle to the other. A supported vehicle body structure such as frame 12 may be disposed over the axle 11 and has longitudinal side members such as channels 13, 13.

The frame 12 is connected to the axle 11 by a suspension to provide the desired cushioning. Brackets 14, 14 are mounted on the channels 13, 13 by bolts 15, 15 and nuts 16, 16. Each of the brackets 14, 14 has a stud shaft member 17 secured to the bracket as by welding.

A pair of brackets 14, 14 is mounted on each channel 13 with the brackets at spaced-apart positions and with the stud members 17, 17 in coaxial relationship for supporting a hollow shaft 18 having an inside diameter substantially the same as the outside diameter of the stud members 17, 17. The shaft 18 is mounted on the stud members 17, 17 for rotation relative thereto and may be spaced from the brackets 14, 14 by cylindrical washers 19, 19 mounted on the stud members.

A cushioning body of resilient rubber material in the form of a rubber cylinder 21 is mounted around each shaft 18 and adhered to the shaft as by vulcanization. An outer shell 22 is disposed around and adhered to the rubber cylinder 21 in a similar manner and the shell is preferably split providing edges 23 and 24. The outer shell 22 is mounted in an outer member such as housing 25 which may have overlapping edges forming an outer shoulder 26 and an inner shoulder 27. The overlapping portions of the housing 25 are secured together in a suitable manner as by welding the edge and housing wall together at the shoulder 25. The edge at shoulder 27 may be turned inward of the housing forming a rib 28 for abutting the edge 24 of the shell 22 when the shell, shaft 18 and intervening rubber cylinder 21 are inserted in the housing 25. The edge 23 of the shell 22 abuts the shoulder 27 of the housing 25 in the assembled condition and prevents relative movement of the shell in the clockwise direction relative to the housing as shown in Fig. 3 which is the direction in which the load is applied.

An arm 29 is mounted on each housing 25 and extends outwardly and substantially transversely of the vehicle to a point where the arm is pivotally connected to the axle 11. A torsion spring such as that described above may be provided at either end of the arm 29 but preferably torsion springs are provided at both ends of the arm which has the advantage of supplying the pivoted connection in the springs themselves.

As shown in the drawings the pivotal connection of the arm 29 to the axle 11 includes a rubber cushioning body. The arm 29 is mounted on a cylindrical housing 31. Within the housing 31 is mounted a cushioning unit having an outer shell 32 which is preferably split at 33 and 34. A hollow shaft 35 is disposed within the shell 32 and a cushioning body of resilient rubber in the form of a rubber cylinder 36 is interposed between the shaft and the shell 32 and adhered to the abutting surfaces as by vulcanization.

The housing 31 and shell 32 have aligned threaded apertures 37, 37 into which studs 38, 38 are threaded to prevent relative rotation of the abutting members. The shaft 35 is supported by a rod 39 passing through the shaft and through lugs 41, 41 of a bracket 42 mounted on the axle 11 as by studs 40, 40. The lugs 41, 41 are disposed at each end of the shaft and have projections 43, 43 in the opposing faces for engagement in slots 44, 44 in the shaft 35 to prevent the turning of the shaft. The rod 39 is threaded at the ends and nuts 45, 45 are threaded on the rods to urge the lugs against the shaft 35 and hold the projections 43, 43 in the slots 44, 44.

The shaft 18 is prevented from turning in the counterclockwise direction as shown in Fig. 3 by an arm 46 mounted fixedly on the shaft at one end and extending radially outward from the shaft. The arm 46 may be connected to the frame 12 by a bolt 47 threaded in a bushing 48 at the end of the arm and engaging a stop bracket 49 mounted on the channel 13 of the frame 12. A lock nut 50 may be threaded on the bolt 47 to hold it in any desired position relative to bushing 48. The bracket 49 has a bearing plate 51 with a concave face 52 against which the bolt 47 bears in its various positions of adjustment.

The arrangement is such that the weight of the vehicle causes the rubber cylinders 21, 21 and 36, 36 to be stressed torsionally about the spring shafts 18, 18 and 35, 35. Increases and decreases in this torsional stress are caused by the wheel deflections upwards or downwards relative to the frame. In addition provision is made for stressing the rubber cylinders 21, 21 and 36, 36 in radial compression of varying amounts in the range of wheel deflection to provide the desired variable spring rate.

Preferably the arms 29, 29 connecting the housing 25, 25 and 31, 31 are of such length that in the normally loaded static condition of the vehicle as shown in full lines in the drawings the portions of rubber cylinders 36, 36 and 21, 21 between the arms 29, 29 and the shafts 18, 18 and 35, 35 are stressed in compression radially of the spring. In operation, the centers of shafts 39, 39 remain the same distance apart because they are mounted on the axle 11 which is rigid and substantially inextensible. As shown in Fig. 3 the center of shaft 39 indicated by A must move in a straight path Y—Y upon vertical deflection of the axle 11 relative to the frame 12. The path which the center of the shaft 39 would take by virtue of its swinging movement if not restricted by the connecting axle 11 is shown in dot-dot-dash lines and designated by letters B. C and D in Fig. 3. At points B and D the path of the shaft 39 in the unrestrained condition intersects the path Y—Y which the shaft takes when connected by axle 11. It can be seen therefore that the rubber cushioning cylinders 21 and 36 are stressed radially in compression in the direction of the arm 29 as well as in torsion between the positions indicated by B and D at which positions the cushioning bodies are relieved of such compression. Then at positions of the shaft 39 above B or below D the cushioning bodies 21 and 36 are again stressed in compression as well as in torsional shear. This addition of compression stresses to the torsional shear stresses imposed on the cushioning bodies 22, and 36, is effective to increase the resistance of the suspension to deflection.

The arrangement is such that the spring rate increases rapidly in the extreme positions of the range of spring movement and eliminates the necessity of having limiting stops or bumpers to prevent excessive vertical movement of the axle 11 relative to the frame 12.

When the shaft 39 moves radially relative to sleeve 32 to compress the rubber cylinder 36 in compression this is accompanied by tension in the portion of the rubber cylinder which is at the other side of the shaft owing to the bonding of the rubber cylinder to the sleeve but such tension is substantially dominated by the compression in the spring and the total effect may be considered essentially a compression effect.

As shown in Fig. 3 when the axle 11 moves upward relative to the frame 12 and carries the shaft 39 beyond the position indicated by B the arms 29, 29 are stressed in tension and the rubber cylinders 21 and 36 are stressed in torsional shear and are stressed in increasing amounts in compression providing sufficient resistance to stop the upward movement of the shaft.

In a like manner the downward movement of the axle 11 relative to frame 12 below point D shown in Fig. 3 is limited by the resistance of the rubber cylinders 21 and 36 in radial compression even though there may be no resistance in torsional shear to downward movement in this range.

A certain amount of initial torsion in the cushioning bodies is desirable to support the vehicle with the arm 29 in the horizontal position in the static load condition of the vehicles. The initial torsional stress in the cushioning bodies may be obtained by adjustment of arm 46. As shown in Fig. 3 the arm 46 may be turned in the clockwise direction by turning bolt 47 in a direction to urge the bushing 48 of arm 46 away from the bracket 49. Turning the arm 46 in a clockwise direction moves shaft 18 in a clockwise direction and increases the torsional resistance of the cushioning body 21 to upward movement of axle 11 relative to the frame 12. This adjustment may be used to increase the torsional resistance of the cushioning bodies in the loaded condition of the vehicle and reduce the torsional shear of the cushioning bodies in the unloaded condition of the vehicle. In the embodiment shown in the drawings only the cushioning bodies 21, 21 attached to the frame 12 are shown with means for adjusting the torsional stresses. However, it can be seen that adjusting means can also be provided for the other cushioning bodies if desired. This may be effected for example by providing two or more slots like slots 44, 44 in the ends of shafts 35, 35 at selected positions into which the projections 43, 43 may be inserted to change the position of the shaft.

The arrangement makes possible complete isolation of the axle and wheels from the frame by rubber which has the advantage of reducing the transmission of vibration and noise. Also in addition to cushioning the normal wheel deflections the rubber springs yield to some degree in all directions and thus are effective to reduce transmission of minor road shocks and to increase riding comfort.

Variations may be made without departing from the scope of the invention as set forth in the following claims.

I claim:

1. A resilient suspension for a vehicle comprising a frame structure, a rigid axle extending transversely of said frame structure, a wheel mounted at each end of the axle and spaced laterally from said frame, and a pair of arms each being rigid and inextensible and having a pivotal connection to the frame structure and having a pivotal connection with the axle adjacent a wheel, one of the arms of said pair projecting laterally from one side of the frame structure and the other arm projecting laterally from the opposite side of said frame structure, the arms limiting relative movement of the axle with respect to the frame to a determinate generally vertical path and the arms being movable arcuately about said pivotal connections in response to said movement of the axle, each of said pivotal connections being a rubber torsion spring including a body of rubber-like material, the arms and said axle having a statically loaded position relative to the frame in which said arms are disposed generally horizontally and with said rubber bodies of the pivotal connections distorted in radial compression by forces acting in a direction to impart compressive stress in each arm, and said arms being movable arcuately by the movement of the axle in said determinate path to a second position at which said distortion of the rubber bodies is relieved and beyond which second position further movement of the arms and said axle is retarded by distortion in radial compression of said rubber bodies by forces acting in a direction to stress said arms in tension.

2. A resilient suspension according to claim 1 which additionally comprises means for rotatably adjusting the torsional stress in the rubber body of one of the pivotal connections of each arm so that variable loads may be carried by the vehicle at the same cushioning position of the axle relative to said supporting frame structure.

3. A resilient suspension comprising a supported structure, a rigid supporting member disposed transversely of said supported structure, and a pair of arms each being rigid and inextensible and having a pivotal connection to said supported structure and having a pivotal connection to the rigid supporting member, one of the arms of said pair projecting laterally from one side of said supported structure and the other arm projecting laterally from the opposite side of said supported structure, the arms limiting relative movement of said supporting member with respect to the supported structure to a determinate generally vertical path and the arms being movable arcuately about said pivotal connections in response to said movement of the supporting member, one of said pivotal connections of each arm being a rubber torsion spring including a body of rubber-like material, the arms and said supporting member having a statically loaded position relative to the frame in which said arms are disposed generally horizontally and with said rubber bodies of the pivotal connections distorted in radial compression by forces acting in a direction to impart compressive stress in each arm, and said arms being movable arcuately by the movement of said supporting member in said determinate path to a second position at which said distortion of the rubber bodies is relieved and beyond which second position further movement of the arms and said supporting member is retarded by distortion in radial compression of said rubber body by forces acting in a direction to stress said arms in tension.

4. A resilient suspension comprising a supported frame, a frame-supporting member spaced from the frame and disposed transversely of the frame, a rigid inextensible arm extending transversely to the frame and having a pivotal connection to the frame and a pivotal connection to said supporting member, and means in addition to said arm connecting the frame to said supporting member at positions spaced transversely from said pivotal connections of said arm, said arm and said means cooperating to limit relative movement of said supporting member with respect to the frame to a determinate generally vertical path, the arm being movable arcuately about said pivotal connections in response to movement of the supporting member, at least one of the pivotal connections of said arm being a rubber torsion spring having a rubber body stressed torsionally by the arcuate movements of the arm, the arm and said means and said supporting member having a statically loaded position relative to the frame in which said arm extends substantially perpendicularly to the direction of said determinate path of the supporting member and in which said rubber body is distorted in radial compression by forces acting in a direction to impart compressive stress in the arm, and said arm being movable arcuately by said movement of the supporting member to a second position away from said static position at which said distortion of the rubber body is relieved and beyond which further movement of said member is retarded by distortion of said rubber body in radial compression in a direction opposite to that of the statically loaded position.

5. A resilient suspension comprising a supported frame structure, a rigid frame-supporting member disposed transversely of the frame in spaced relation to the frame, a pair of arms each being rigid and inextensible and disposed transversely of the frame and each having a pivotal connection to the frame and a pivotal connection to said supporting member, the respective pivotal connections of one of the arms being spaced transversely relative to the frame from the corresponding pivotal connections of the other arm, the arms cooperating to limit relative movement of said supporting member with respect to the frame to a determinate path and the arms being movable arcuately about said pivotal connections by said movement of the supporting member, one of said pivotal connections of one arm being a rubber-torsion spring having a rubber body stressed torsionally by the arcuate movement of the arm, the portion of the latter said arm joined to the supporting member having a normal arcuate path which intersects said determinate path of movement of the portion of the supporting member to which the arm is joined at two spaced points, and said rubber body of the torsion spring of the latter said arm being distorted in radial compression by forces acting in a direction to impart compressive stress to said arm when said arm is in a position intermediate said points, and the rubber body being stressed in compression in the opposite direction when the arm is moved by said supporting member to a position beyond either of said points.

6. A resilient mounting comprising a supported frame structure, a frame-supporting member spaced from and disposed transversely of the frame, means flexibly connecting one portion of the frame to one portion of said member for movement of the member relative to the frame, a pivotal connection on the frame member spaced transversely from said means, a substantially rigid inextensible arm having one end engaged with said pivotal connection and an opposite end projecting away from the frame, a pivotal connection on said supporting member to which said opposite end of the arm is connected, the axes of said pivotal connections being parallel each other, one of said pivotal connections being a rubber torsion spring having a rubber body stressed torsionally by arcuate movements of the arm, and the arm and said means cooperating to limit movement of said supporting member to a determinate path, the supporting member and said arm having a static position relative to the frame in which said axes of the pivotal connections are spaced a predetermined minimum distance apart to maintain the portion of said rubber body disposed toward the opposite pivotal connection in radial compression, and the supporting member having a second position in said determinate path away from said static position at which said compression is relieved and beyond which further movement of the member increases the distance between the axes of the pivotal connections to compress said rubber body radially in the opposite direction from the compression of the static position to retard said further movement of the supporting member.

References Cited in the file of this patent

UNITED STATES PATENTS

| | | |
|---|---|---|
| 1,919,033 | Noble | July 18, 1933 |
| 2,226,406 | Krotz | Dec. 24, 1940 |
| 2,255,820 | Schieferstein | Sept. 16, 1941 |
| 2,305,732 | Piron | Dec. 22, 1942 |
| 2,345,201 | Krotz | Mar. 28, 1944 |
| 2,436,681 | Swenson | Feb. 24, 1948 |
| 2,467,721 | Avila | Apr. 19, 1949 |
| 2,509,769 | Hirst | May 30, 1950 |